(12) United States Patent
Flynn

(10) Patent No.: US 6,950,951 B2
(45) Date of Patent: Sep. 27, 2005

(54) POWER CONTROL SIGNALLING

(75) Inventor: David Walter Flynn, Cambridge (GB)

(73) Assignee: ARM Limited, Cambridge (GB)

( * ) Notice: Subject to any disclaimer, the term of this patent is extended or adjusted under 35 U.S.C. 154(b) by 592 days.

(21) Appl. No.: 10/134,467

(22) Filed: Apr. 30, 2002

(65) Prior Publication Data

US 2003/0204757 A1 Oct. 30, 2003

(51) Int. Cl.$^7$ .............................. G06F 1/26; G06F 1/32; G05F 5/00
(52) U.S. Cl. ..................... 713/300; 713/320; 323/299
(58) Field of Search ................................ 713/300, 310; 340/7.36, 7.37

(56) References Cited

U.S. PATENT DOCUMENTS 6,140,714 A * 10/2000 Fujii ........................... 307/18

* cited by examiner

*Primary Examiner*—Rehana Perveen
*Assistant Examiner*—Stefan Stoynov
(74) *Attorney, Agent, or Firm*—Nixon & Vanderhye P.C.

(57) ABSTRACT

Data processing systems (2) having power management mechanisms (8, 10, 14, 16) for one or more power domains (6, 12) utilise an active high power enable request generated by a power controller (8, 14) to trigger a power supply unit (10, 16) to generate a required power supply signal. Pending valid generation of this power supply signal, or more generally when a power domain is switched off, an active signal which is generated by the power controller (8, 14) and applied to the reset input of the power domain (6, 12) is used to hold the power domain (6, 12) in an inactive reset state. When the power supply signal becomes valid, the active signal releases the power domain (6, 12) to commence operation.

45 Claims, 6 Drawing Sheets

POWER CONTROL SIGNALLING

BACKGROUND OF THE INVENTION

1. Field of the Invention

This invention relates to the field of data processing systems. More particularly, this invention relates to the power control signalling within data processing systems whereby portions of a data processing system may be powered up or powered down.

2. Description of the Prior Art

It is known to provide data processing systems having multiple power domains which may be selectively powered up or powered down. As an example, a data processing system may have a CPU core which is permanently powered and separate DSP or floating point arithmetic units that are only powered when they are needed. This technique is useful in reducing the overall power consumption of a data processing system.

Whilst such power control strategies are effective in reducing power consumption, they are typically complex to design and provide as considerable care needs to be taken to ensure that the different portions of the circuit may properly close down and start up again in all appropriate circumstances. Furthermore, as circuit complexity increases, it is increasingly difficult to select and then test the points within a circuit at which the power supply should be gated and the way in which the control of the power supply to different portions of the circuit should be handled.

An additional difficulty that arises in this context is that increasing numbers of data processing circuits are being designed in high level design languages and then synthesised with appropriate tools down to gate level. Whilst such an approach has many advantages in terms of the speed of generating the designs and the way that such designs may be validated, a problem arises in that such design tools typically assume a constant unvarying power supply. These high level design language approaches and tools are ill suited to use with environments in which it is desired to selectively control the power supply to different portions of the circuit as it operates. If a high level design language is used to design a circuit and then selectable power supply functionality added by manually inserting additional circuit elements and gates, a significant problem arises in reliably verifying the design concerned.

SUMMARY OF THE INVENTION

Viewed from one aspect the present invention provides apparatus for processing data, said apparatus comprising:

data processing circuits operable to perform data processing operations and powered by a power supply signal;

a power controller operable to control said power supply signal supplied to said data processing circuits; wherein said power controller is operable to generate a power control signal to trigger generation of said power supply signal with a level operable to power said data processing circuits;

said data processing circuits are responsive to an active signal to adopt a predetermined reset state independent of any preceding state; and said power controller is operable following generation of said power control signal to de-assert said active signal to said data processing circuits to force said data processing circuits to adopt said predetermined reset state until said power supply signal has said level operable to power said data processing circuits, whereupon said active signal is asserted such that said data processing circuits may commence data processing operation.

The invention recognises the difficulty in providing power control within complex data processing circuits and seeks to provide a technique for signalling/controlling the power management in a way that is uniform and methodical as well as being compatible with existing high level design languages. More particularly, the invention recognises that the signals that control the resetting of data processing circuits may also be used to control those data processing circuits during power management processes such that the data processing circuits may be held in a predetermined state pending the availability of an appropriate power supply signal generated in response to a power control signal generated in a power controller and then release the data processing circuits to start operation from a known safe state. As reset signals are typically already provided within many data processing system designs and are catered for by the high level design languages and associated tools, the use of such reset signals to also control power management enables this functionality to be added without changes being required in the high level design languages or their associated tools.

It will be appreciated that the power supply signal provided to the data processing circuits for which the power is being managed could take a wide variety of forms. However, a typical system will operate with the power supply signal having a high level operable to power the data processing circuit and a low level which is not operable to power the data processing circuits.

It will be appreciated that whilst the reset signal could be active high or active low, in preferred embodiments the reset signal is active low as this provides a more useful default position whereby a reset signal has to be actively powered in order that it will release to operation the data processing circuits which it is controlling. This feature is particular significant within systems in which the signal values tend to decay to a low level when unpowered.

In an analogous way, preferred embodiments are such that the power control signal is active to trigger generation of the power supply signal when it has a high level. Thus, this signal has to be actively powered and asserted in order to trigger the generation of further power supply signals.

These design advantages may be further used in embodiments in which all outputs from the data processing circuits use active high signalling and all inputs to the data processing circuit other than any reset signals use active high signalling.

Whilst it will be appreciated that the invention could be used in embodiments having only one domain which is selectively powered, the invention is particularly useful in embodiments having multiple power domains. The management of power within such multiple domain systems is an increasingly difficult task with which the present technique assists.

Within such multi domain environments preferred embodiments serve to gate inter-domain signals being passed between power domains when a reset signal is being asserted either on the source domain or the destination domain as appropriate.

In some embodiments there may be fewer power supply signal lines than there are power domains or other requirements that make it desirable to use a logical combination of the power control signal and the reset signal in order to gate supply of power to a particular power domain.

More sophisticated power management systems in which the present techniques are particularly useful are ones in which the power domains are hierarchically arranged. Within such hierarchical environments it is common that a domain lower in the hierarchy may be unpowered whilst a domain higher in the hierarchy remains powered. The reset signal from one power domain within the system may be supplied to other power domain in order to give information to those other power domains as to whether or not other portions of the system are powered or unpowered at a particular point in time.

Whilst it will be appreciated that the actual power supply unit which generates the power supply signal may be separately provided from the circuit elements which include the data processing circuits and various power domains, it is possible for such a power supply unit to be integrated with these other elements, such as upon an appropriate single integrated circuit. In either circumstance, the power supply unit may advantageously serve to generate a power valid signal which indicates to the power controller that the power supply signal generated by the power supply unit has reached a valid level. In this way analogue type effects associated with the switching on and off of a power supply signal may be isolated within the power supply unit which merely passes a power valid signal to the power controller when an appropriate power supply signal is being generated.

It will be appreciated that in preferred embodiments the power valid signal may highly conveniently be used to control removal of the reset signal in order to enable the data processing circuits to commence processing operation using the valid power supply signal.

Viewed from another aspect the present invention provides a method of controlling power supply to data processing circuits powered by a power supply signal, said data processing circuits being responsive to an active signal to adopt a predetermined reset state independent of any preceding state, said method comprising the steps of:

generating a power control signal to trigger generation of said power supply signal with a level operable to power said data processing circuits; and following generation of said power control signal, de-asserting said active signal to said data processing circuits to force said data processing circuits to adopt said predetermined reset state until said power supply signal has said level operable to power said data processing circuits, whereupon said active signal is asserted such that said data processing circuits may commence data processing operation.

Viewed from a further aspect the present invention provides a signal protocol for controlling supply of power to data processing circuits powered by a power supply signal, said signal protocol comprising:

a power control signal to trigger generation of said power supply signal with a level operable to power said data processing circuits; and an active signal operable to force said data processing circuits to adopt a predetermined reset state independent of any preceding state; wherein following generation of said power control signal said active signal is de-asserted to said data processing circuits to force said data processing circuits to adopt said predetermined reset state until said power supply signal has said level operable to power said data processing circuits, whereupon said active signal is asserted such that said data processing circuits may commence data processing operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
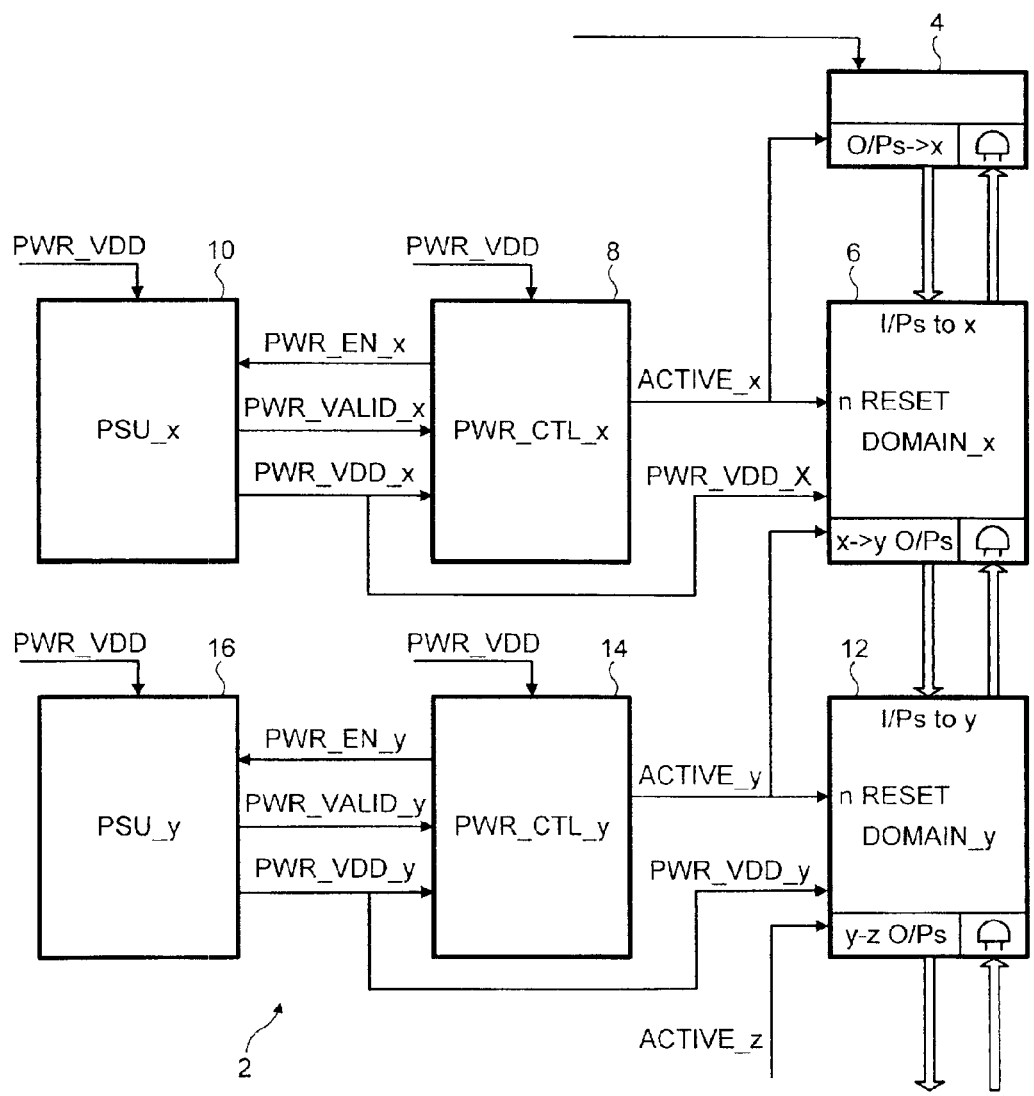
FIG. 1 schematically illustrates a data processing system including multiple power domains.

FIG. 1 schematically illustrates a data processing system 2 including multiple power domains. An overall system power supply PWR_VDD is applied to the data processing system 2 as a whole (e.g. this may be the power supply applied to the power pin of an integrated circuit as a whole). A master power validating unit 4 may serve to detect the presence of the overall power supply PWR_VDD and when this is validly present in an in-range form allow other parts of the power management system to operate and the data processing system 2 as a whole to commence operation. A first power domain 6 comprises data processing circuits for performing desired data processing operations. Associated with the first power domain 6 is a first power controller 8 and a first power supply unit 10. The first power controller 8 is itself powered by the main power supply signal PWR_VDD which has been validated by the master power controller 4. In this example embodiment, the first power domain 6 is designed to be automatically started as the main power supply PWR_VDD first becomes available. Accordingly, as the first power controller 8 detects the valid main power supply PWR_VDD it serves to issue a power control signal PWR_EN_x to the first power supply unit 10. This is a request for the first power supply unit 10 to generate and supply the first power signal PWR_VDD_x which is to be used by the first domain 6. The first power supply unit 10 will then seek to generate this first power supply signal PWR_VDD_x (which may have a different voltage or other characteristics from the main power supply PWR_VDD) and this will take a finite period of time to settle to a steady value. When a steady value has been reached, then the first power supply 10 generates a power valid signal PWR_VALID_x which is passed back to the first power controller 8.

The first power controller 8 also serves to generate an active signal ACTIVE_x which is supplied to the first power domain 6. This is an active high signal in that a low value of this signal is interpreted by the first power domain 6 as requiring a reset (since ACTIVE_x is connected to the active-low reset input of power domain 6) to be forced in its data processing circuits, i.e. to force the data processing circuits into a predetermined reset state. This reset is asserted by the first power controller 8 from its initial power up on receipt of the main power supply signal PWR_VDD until the power valid signal PWR_VALID_x is returned from the first power supply unit 10. At this time the first power controller 8 can be sure that the first power signal PWR_VDD_x has reached a stable and suitable value for powering the first power domain 6 and accordingly the reset signal can be removed from the first power domain 6 and the first power domain 6 allowed to commence data processing operations, i.e. become active.

It will be appreciated that the first power control signal PWR_EN_x and the first active signal ACTIVE_x provide a form of handshaking whereby after switching on of a power supply signal has been requested the confirmation of this signal being available and valid is subsequently confirmed to the first power domain 6 by the active signal which also provides the reset signal for the first power domain 6.

Also provided within the data processing system 2 are a second power domain 12, a second power controller 14 and a second power supply unit 16. The second power domain 12 and its associated power controller 14 and power supply unit 16 operate in the same way as the first power domain 6 and its associated power controller 8 and power supply unit 10. In addition, the active signal ACTIVE_y generated by the second power controller 14 is also supplied to the first power domain 6 as well as to the second power domain 12. This conveys information to the first power domain 6 as to whether or not the second power domain 12 is currently powered or unpowered. This may be used to gate inputs received from that second power domain 12 to ensure inappropriate inputs do not affect the operation of the first power domain 6 or in other ways to control the operation of the first power domain 6 to adapt to whether or not the second power domain 12 is powered or unpowered. Output signals from a power domain may also be gated at their source within the power domain itself using its own active signal to block inappropriate output signals being passed on to other elements within the data processing system 2.

Figure 2:
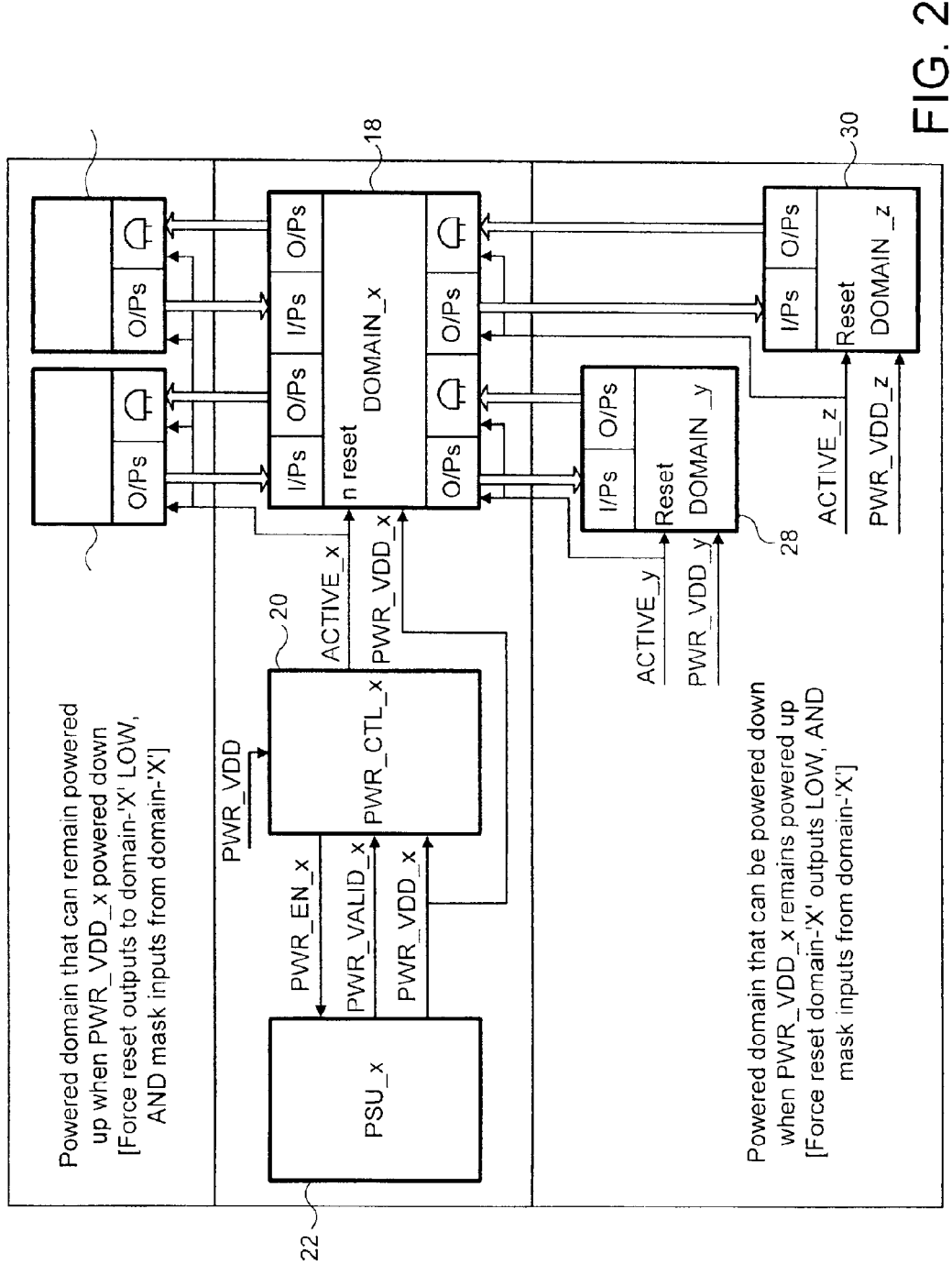
FIG. 2 schematically illustrates a data processing system incorporating a hierarchy of power domains.

FIG. 2 schematically illustrates a generalised hierarchical arrangement of power domains. In particular, a power domain 18 with its associated power controller 20 and power supply unit 22 is positioned within a hierarchy of power domains having both higher elements 24, 26 and lower elements 28, 30. The power control signal request for a power supply signal and the use of an active signal to qualify the resulting power supply signal may be methodically applied throughout the hierarchy in order to provide a uniform power management signalling protocol. This protocol is well suited for use with high level design languages such as RTL or Verilog. Such high level design languages typically include provision for asynchronous reset signals (which can be adapted to serve as active signal) within the signals supported by the cells within their cell library, their synthesis tools, their validation tools and the like.

In the context of FIG. 2 it will be seen that the active signal of a power domain is passed upwards in the hierarchy to the next higher level. This type of arrangement is well suited to a power management hierarchy in which core power domains are permanently powered and then successive rings of power domains for increasingly infrequently required circuit elements are provided lower in the hierarchy in a manner in which they may be powered on or powered off.

It would be possible to provide a system in which the power state of every power domain was signal to every other power domain using its active signal, but this heirarchical tiered approach in which each level signals to the level above is well suited to practical implementation and scales well to large designs.

Figure 3:
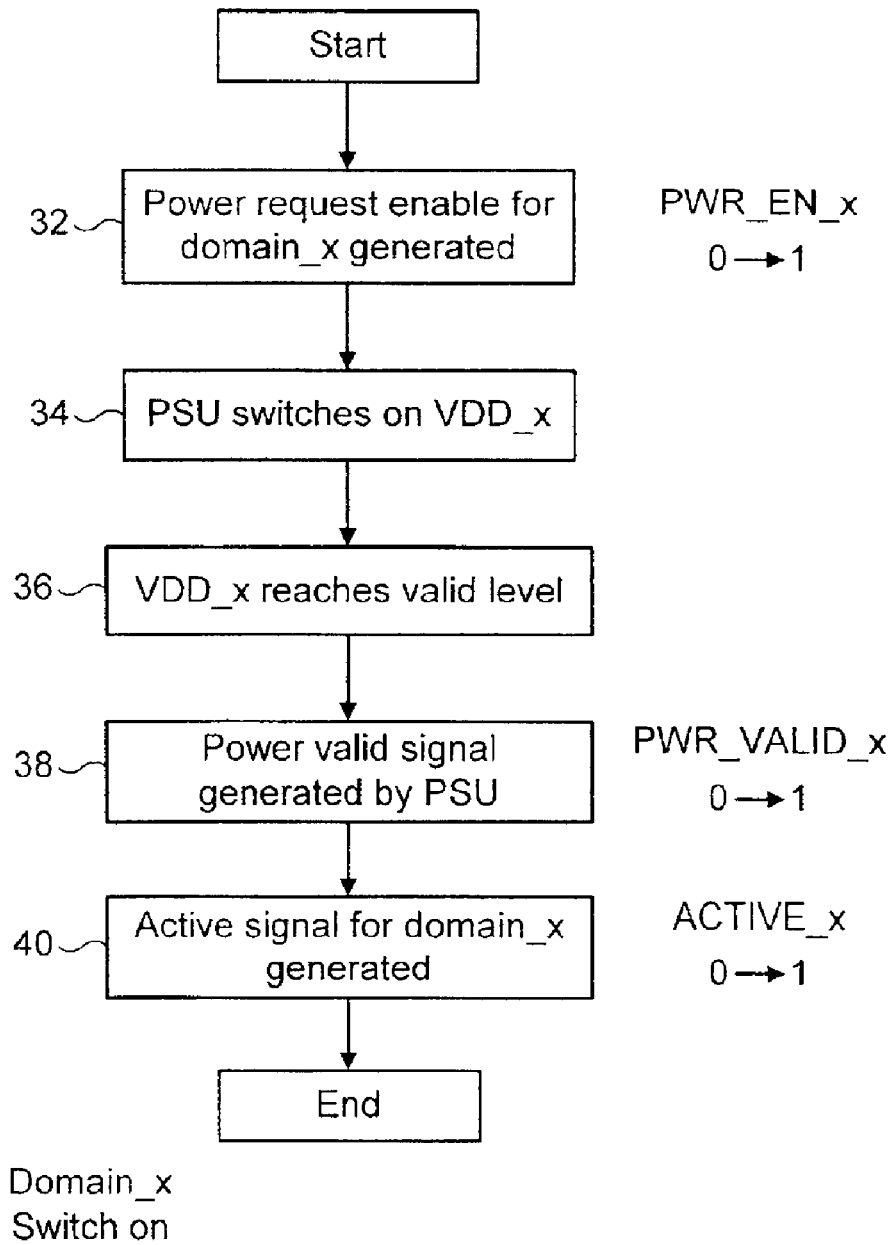
FIG. 3 is a flow diagram schematically illustrating the switch on of a power supply signal.

FIG. 3 is a flow diagram illustrating the processes which take place when the power supply signal is switched on to a power domain. At step 32 a power request enable signal for the power domain concerned is generated by its associated power controller and passed to the associated power supply units. This is an active high signal and so the generation of this signal corresponds to the PWR_EN_x changing from a lower level to a high level. At step 34 the associated power supply unit starts to switch on the requested power supply signal VDD_x. At step 36 the requested power supply signal VDD_x is detected as having reached a valid level (e.g. stable and within 10% of a predetermined known good level). At step 38 the power supply unit generates a power valid signal for the power supply signal. This power valid signal PWR_VALID_x is an active high signal and accordingly a transition in this signal takes place from low to high.

Throughout the preceding steps 32, 34, 36 and 38 the active signal for the power domain in question has been held low. The active signal is an active high signal and accordingly the power domain in question has been held reset, i.e. forced to a predetermined state. At step 40 this constraint is released and the active signal ACTIVE_x is asserted corresponding to a transition from a low (reset asserted) to a high (reset removed) level.

Figure 4:
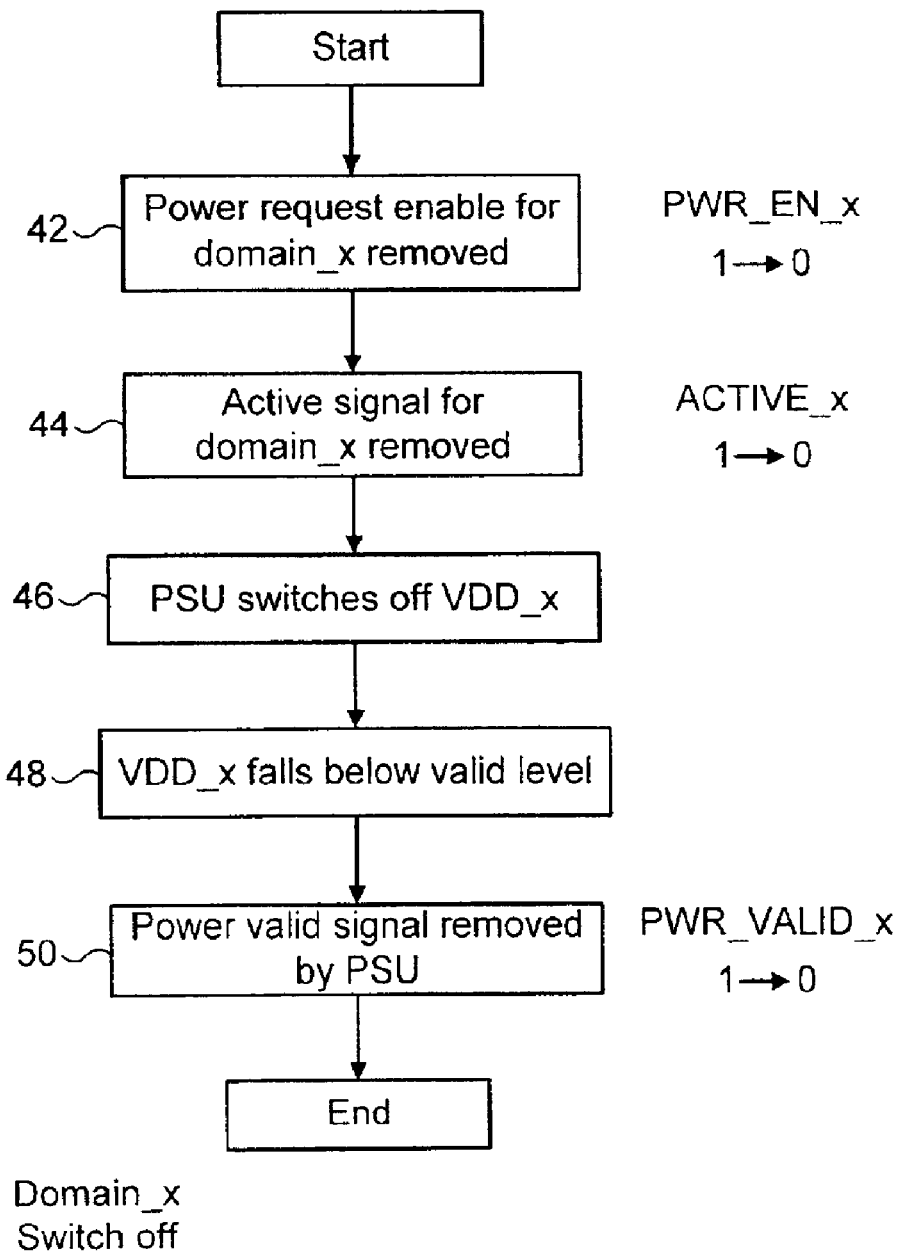
FIG. 4 is a flow diagram schematically illustrating the switch off of a power supply signal.

FIG. 4 is a flow diagram illustrating the processes performed on switching off a power supply signal to a power domain. At step 42 the power request enable signal for the power domain concerned is removed by the associated power controller. At the same time, the active signal for the power domain concerned is de-asserted to the power domain in order to stop operation of the power domain and force the power domain into a predetermined reset state. This is done prior to the power supply signal decaying to a point at which reliable operation of the power domain is no longer assured. At step 46, the power supply unit switches off the power supply signal concerned. At step 48 the power supply signal concerned is detected as falling below a valid level and accordingly step 50 proceeds to remove the power valid signal generated by the power supply unit.

It will be seen that in the operation of FIG. 3 the active signal is held low which keeps the power domain in its predetermined state in which it is not performing data AI processing operations until the power supply signal is validly available whereupon the first power domain is released to operate. Conversely, in FIG. 2 the power domain starts in an active state with the active signal allowing processing to be performed and as the power request enable signal is removed the active signal is removed such that the power domain is forced to reset to a fixed predetermined state and continued processing is suspended.

Figure 5:
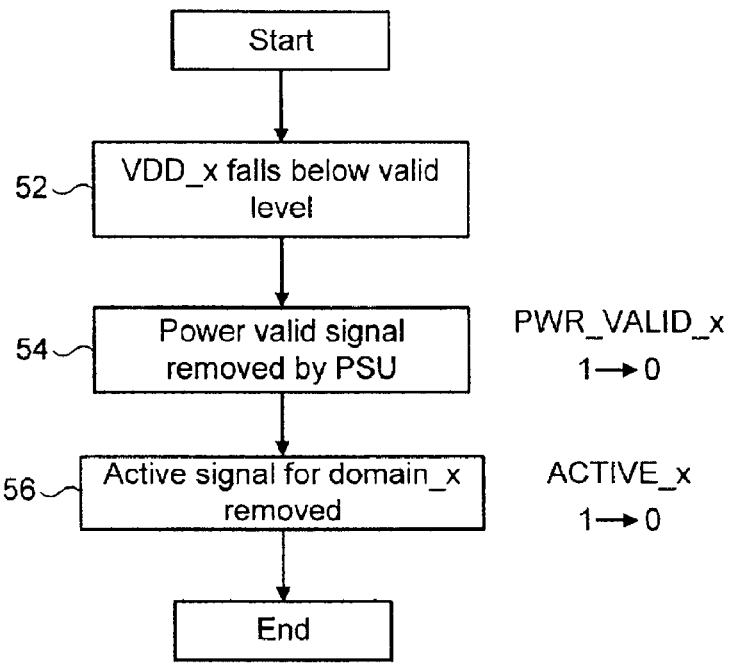
FIG. 5 is a flow diagram schematically illustrating the failure of a power supply unit.

FIG. 5 is a flow diagram schematically illustrating processing performed when the power supply signal produced by the power supply unit fails, e.g. falls out of acceptable tolerance levels during a brown out. At step 52 the power supply signal falls below its valid level. At step 54 the power valid signal generated by the power supply unit is removed. At step 56 the removal of the power valid signal is detected by the power control signal and this in turn serves to change the active signal such that the power domain is forced into its reset state and further processing is stopped. It will be appreciated that the operation illustrated in FIG. 5 takes place independently of generation of any request signal from the power controller to the power supply unit.

Figure 6:
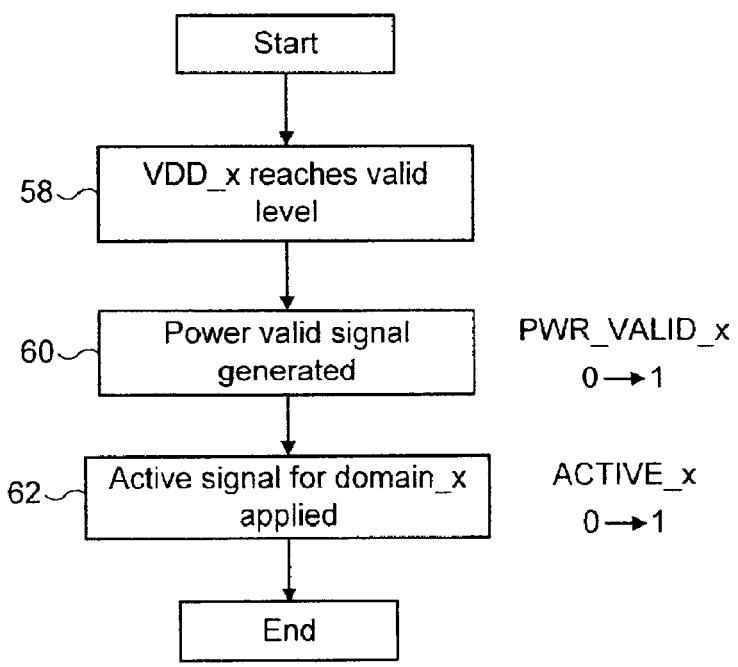
FIG. 6 is a flow diagram schematically illustrating a power supply signal being restored by a power supply unit.

FIG. 6 is a flow diagram illustrating operation when the power supply unit autonomously restores the power supply signal. At step 58 the power supply signal is detected as reaching a valid level. At step 60 the power supply unit reasserts the power valid signal. At step 62 the power valid signal being reasserted is detected by the power controller and accordingly the active signal is reasserted such that the power domain is released to commence processing operation.

Figure 7:
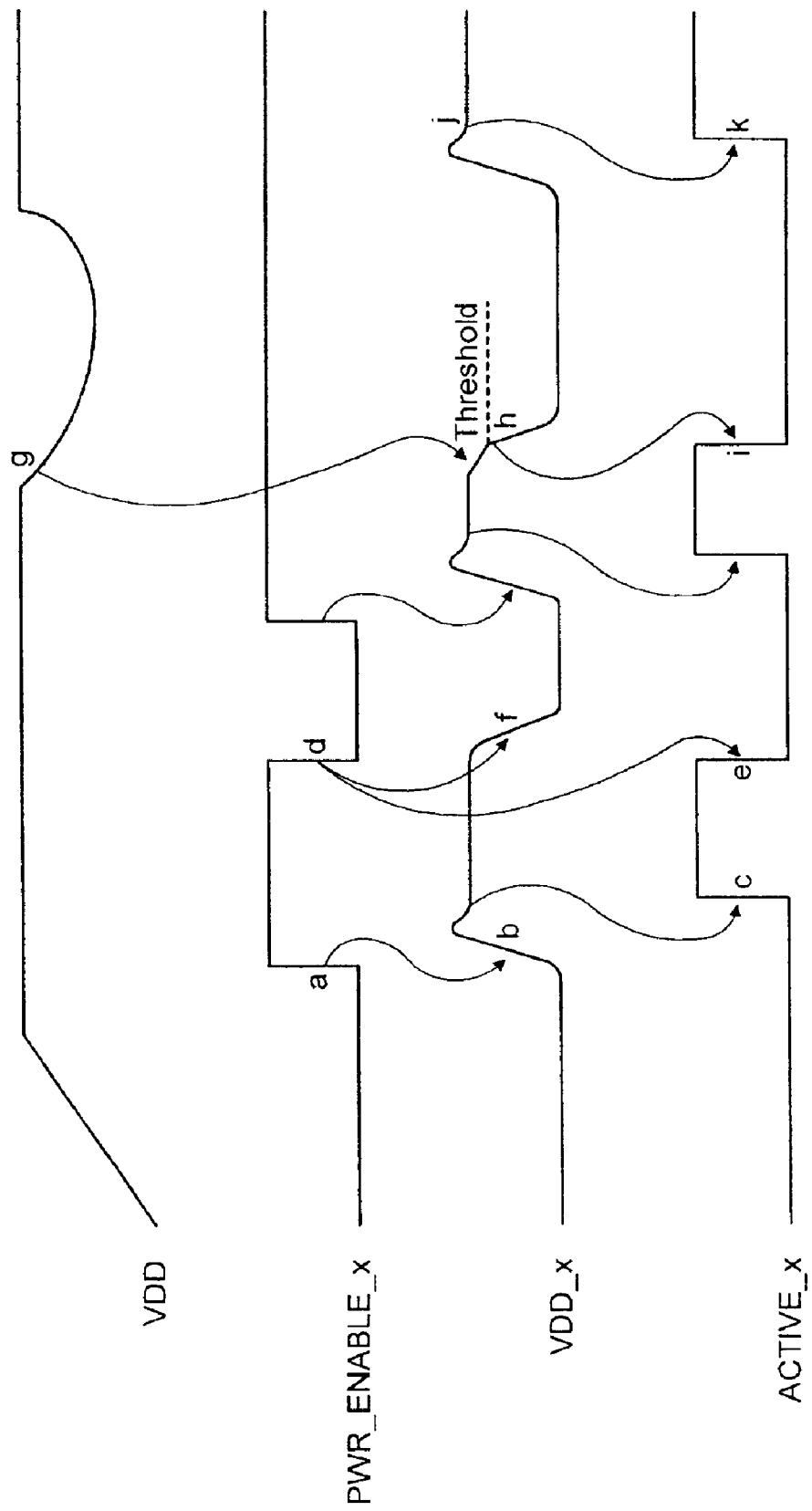
FIG. 7 is a diagram illustrating signal levels and the timing relationships therebetween for various types of operation of the present technique.

FIG. 7 is a diagram illustrating various signal levels and their relationships corresponding to the above described different types of operation. The overall power supply signal VDD as supplied to the data processing system 2 as a whole is illustrated in the top line. Initially this is seen to ramp up to a fixed valid level. Later on in time this main power supply signal decays in an uncontrolled fashion below a valid level prior to being restored to a valid level. A power request enable signal PWR_ENABLE_x is illustrated. This is generated by a power controller for domain x. At point "a" the main power supply Vdd is valid and the power controller asserts the power enable request signal which is passed to an associated power supply unit. This causes the power supply unit to start to generate the power supply signal Vdd_x that is to be supplied to the associated power domain as illustrated at time "b". When the power supply signal Vdd_x reaches a valid level, then this triggers the active signal ACTIVE_x to be generated as illustrated at point "c", the active signal ACTIVE_x is applied to the reset input of the power domain concerned and the reset behaviour is active low such that when the active signal is applied high the power domain concerned is released to start operation.

At point "d" the power enable request signal is removed by the power controller and this simultaneously triggers the active signal to be removed at point "e" and the power supply unit to cease to supply the power supply signal at point "f".

The power domain is then restarted and re-powered. At point "g" the main power supply VDD starts to decay and reaches a point such that the power supply signal VDD_x has itself decayed below a threshold level which triggers the active signal for the power domain to be removed at point "i". This takes place without the power controller changing the power enable request signal which remains asserted.

When the main power supply VDD has been restored, the power supply signal VDD_x is itself restored above its threshold level as indicated at point "j" which in turn causes the active signal to be reasserted at point "k" thus releasing the power domain out of its reset state into an operation state.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:

data processing circuits operable to perform data processing operations and powered by a power supply signal;

a power controller operable to control said power supply signal supplied to said data processing circuits; wherein said power controller is operable to generate a power control signal to trigger generation of said power supply signal with a level operable to power said data processing circuits;

said data processing circuits are responsive to an active signal to adopt a predetermined reset state independent of any preceding state; and said power controller is operable following generation of said power control signal to de-assert said active signal to said data processing circuits to force said data processing circuits to adopt said predetermined reset state until said power supply signal has said level operable to power said data processing circuits, whereupon said active signal is asserted such that said data processing circuits may commence data processing operation, wherein said data processing circuits form a first power domain and further data processing circuits form a least one further power domain, wherein inter-domain signals being passed between power domains are gated so as to be clamped at predetermined levels when an active signal is being asserted upon a power domain that is one of generating said inter-domain signals and receiving said inter-domain signals.

2. Apparatus as claimed in claim 1, wherein said power supply signal is controlled by said power controller to have either a high level operable to power said data processing circuits or a low level non-operable to power said data processing circuits.

3. Apparatus as claimed in claim 2, wherein said active signal serves to force said data processing circuits to adopt said reset state when substantially equal to said low level.

4. Apparatus as claimed in claim 3, wherein signal values within said data processing circuits decay to said low level when said data processing circuit are not powered.

5. Apparatus as claimed in claim 2, wherein said power control signal serves to trigger generation of said power supply signal when substantially equal to said high level.

6. Apparatus as claimed in claim 1, wherein all outputs from said data processing circuits use active high signalling.

7. Apparatus as claimed in claim 1, wherein all inputs to said data processing circuits other than any active signals use active high signalling.

8. Apparatus as claimed in claim 1, wherein said active signal is being asserted upon a power domain that is generating said inter-domain signals.

9. Apparatus as claimed in claim 1, wherein said active signal is being asserted upon a power domain that is receiving said inter-domain signals.

10. Apparatus as claimed in claim 1, wherein said power control signal and said active signal are logically combined to generate a signal operable to gate supply of power to said data processing circuits.

11. Apparatus as claimed in claim 1, wherein said first power domain and said one or more further power domains are arranged in a hierarchy of power domains whereby power domain lower in said hierarchy may be unpowered whilst power domains higher in said hierarchy are powered.

12. Apparatus as claimed in claim 1, wherein said active signal for said first power domain is supplied to at least one of said one or more further power domains to provide information as to whether or not said first power domain is in a powered or an unpowered state.

13. Apparatus as claimed in claim 1, comprising a power supply unit responsive to said power control signal to generate said power supply signal.

14. Apparatus as claimed in claim 13, wherein said power supply unit is operable to provide a power valid signal to said power controller to indicate whether or not said power supply signal has reached a valid level.

15. Apparatus as claimed in claim 14, wherein said power controller uses said power valid signal to control removal of said active signal from said data processing circuits.

16. A method of controlling power supply to data processing circuits powered by a power supply signal, said data processing circuits being responsive to an active signal to adopt a predetermined reset state independent of any preceding state, said method comprising the steps of:

generating a power control signal to trigger generation of said power supply signal with a level operable to power said data processing circuits; and following generation of said power control signal, de-asserting said active signal to said data processing circuits to force said data processing circuits to adopt said predetermined reset state until said power supply signal has said level operable to power said data processing circuits, whereupon said active signal is asserted such that said data processing circuits may commence data processing operation, wherein said data processing circuits form a first power domain and further data processing circuits form one or more further power domains, wherein inter-domain signals being passed between power domains are gated so as to be clamped at predetermined levels when an active signal is being asserted upon a power domain that is one of generating said inter-domain signals and receiving said inter-domain signals.

17. A method as claimed in claim 16, wherein said power supply signal is controlled to have either a high level operable to power said data processing circuits or a low level non-operable to power said data processing circuits.

18. A method as claimed in claim 17, wherein said active signal serves to force said data processing circuits to adopt said reset state when substantially equal to said low level.

19. A method as claimed in claim 18, wherein signal values within said data processing circuits decay to said low level when said data processing circuit are not powered.

20. A method as claimed in claim 17, wherein said power control signal serves to trigger generation of said power supply signal when substantially equal to said high level.

21. A method as claimed in claim 16, wherein all outputs from said data processing circuits use active high signalling.

22. A method as claimed in claim 16, wherein all inputs to said data processing circuits other than any active signals use active high signalling.

23. A method as claimed in claim 16, wherein said active signal is being asserted upon a power domain that is generating said inter-domain signals.

24. A method as claimed in claim 16, wherein said active signal is being asserted upon a power domain that is receiving said inter-domain signals.

25. A method as claimed in claim 16, wherein said power control signal and said active signal are logically combined to generate a signal operable to gate supply of power to said data processing circuits.

26. A method as claimed in claim 16, wherein said first power domain and said one or more further power domains are arranged in a hierarchy of power domains whereby power domain lower in said hierarchy may be unpowered whilst power domains higher in said hierarchy are powered.

27. A method as claimed in claim 16, wherein said active signal for said first power domain is supplied to at least one of said one or more further power domains to provide information as to whether or not said first power domain is in a powered or an unpowered state.

28. A method as claimed in claim 16, comprising generating said power supply signal with a power supply unit responsive to said power control signal.

29. A method as claimed in claim 28, wherein said power supply unit is operable to provide a power valid signal to indicate whether or not said power supply signal has reached a valid level.

30. A method as claimed in claim 29, wherein said power valid signal is used to control removal of said active signal from said data processing circuits.

31. A signal protocol for controlling supply of power to data processing circuits powered by a power supply signal, said signal protocol comprising:

a power control signal to trigger generation of said power supply signal with a level operable to power said data processing circuits; and an active signal operable to force said data processing circuits to adopt a predetermined reset state independent of any preceding state; wherein following generation of said power control signal said active signal is de-asserted to said data processing circuits to force said data processing circuits to adopt said predetermined reset state until said power supply signal has said level operable to power said data processing circuits, whereupon said active signal is asserted such that said data processing circuits may commence data processing operation, wherein said data processing circuits form a first power domain and further data processing circuits form one or more further power domains, wherein inter-domain signals being passed between power domains are gated so as to be clamped at predetermined levels when an active signal is being asserted upon a power domain that is on of generating said inter-domain signals and receiving said inter-domain signals.

32. A signal protocol as claimed in claim 31, wherein said power supply signal is controlled to have either a high level operable to power said data processing circuits or a low level non-operable to power said data processing circuits.

33. A signal protocol as claimed in claim 32, wherein said active signal serves to force said data processing circuits to adopt said reset state when substantially equal to said low level.

34. A signal protocol as claimed in claim 33, wherein signal values within said data processing circuits decay to said low level when said data processing circuit are not powered.

35. A signal protocol as claimed in claim 32, wherein said power control signal serves to trigger generation of said power supply signal when substantially equal to said high level.

36. A signal protocol as claimed in claim 31, wherein all outputs from said data processing circuits use active high signalling.

37. A signal protocol as claimed in claim 31, wherein all inputs to said data processing circuits other than any active signals use active high signalling.

38. A signal protocol as claimed in claim 31, wherein said active signal is being asserted upon a power domain that is generating said inter-domain signals.

39. A signal protocol as claimed in claim 31, wherein said active signal is being asserted upon a power domain that is receiving said inter-domain signals.

40. A signal protocol as claimed in claim 31, wherein said power control signal and said active signal are logically combined to generate a signal operable to gate supply of power to said data processing circuits.

41. A signal protocol as claimed in claim 31, wherein said first power domain and said one or more further power domains are arranged in a hierarchy of power domains whereby power domain lower in said hierarchy may be unpowered whilst power domains higher in said hierarchy are powered.

42. A signal protocol as claimed in claim 31, wherein said reset signal for said first power domain is supplied to at least one of said one or more further power domains to provide information as to whether or not said first power domain is in a powered or an unpowered state.

43. A signal protocol as claimed in claim 31, comprising a power supply unit responsive to said power control signal to generate said power supply signal.

44. A signal protocol as claimed in claim 43, wherein said power supply unit is operable to provide a power valid signal to said power controller to indicate whether or not said power supply signal has reached a valid level.

45. A signal protocol as claimed in claim 44, wherein said power controller uses said power valid signal to control removal of said reset signal from said data processing circuits.

* * * * *